United States Patent [19]

Nakagawa

[11] Patent Number: 5,774,441

[45] Date of Patent: Jun. 30, 1998

[54] METHOD OF AND APPARATUS FOR RECORDING/REPRODUCING VIDEO DATA IN DATA UNITS AS A UNIT OF DATA CORRESPONDING TO A PREDETERMINED NUMBER OF PICTURES

[75] Inventor: Masaki Nakagawa, Zama, Japan

[73] Assignee: Kabushiki Kaisha Toshiba, Kawasaki, Japan

[21] Appl. No.: 416,195

[22] Filed: Apr. 4, 1995

[30] Foreign Application Priority Data

Apr. 8, 1994 [JP] Japan .................................. 6-070900

[51] Int. Cl.⁶ ...................................................... G11B 7/00
[52] U.S. Cl. ............................. 369/59; 869/49; 360/19.1; 360/33.1
[58] Field of Search ................................. 369/58, 59, 47, 369/48, 49, 50, 54, 53, 124, 32; 360/48, 19.1, 20, 14.1, 33.1

[56] References Cited

FOREIGN PATENT DOCUMENTS

| A-0124770 | 11/1984 | European Pat. Off. . |
|---|---|---|
| A-0396285 | 11/1990 | European Pat. Off. . |
| A-0582720 | 2/1994 | European Pat. Off. . |
| A-0606868 | 7/1994 | European Pat. Off. . |
| WO-A-9423428 | 10/1994 | European Pat. Off. . |
| A-0651391 | 5/1995 | European Pat. Off. . |
| A-0651392 | 5/1995 | European Pat. Off. . |
| A-0675493 | 10/1995 | European Pat. Off. . |
| WO-A-9407332 | 3/1994 | WIPO . |

OTHER PUBLICATIONS

H. Owari et al.: "Digital Vision Karaoke System Using MPEG1", IIEEJ Advanced Imaging '93, pp. 34–35, Apr. 16, 1994.

Matuszak, Marcus, "Video von der CD", Funkschau, vol. 65, No. 18, Aug., 1993, Munchen De, pp. 120–125.

*Primary Examiner*—Muhammad N. Edun
*Attorney, Agent, or Firm*—Cushman Darby & Cushman IP Group of Pillsbury Madison & Sutro LLP

[57] ABSTRACT

A data unit DUT including a DUT header, sub video data, audio data, and main video data. The main video data is compression-encoded MPEG data, and a predetermined number of GOPs (Group of Pictures) defining an encoding unit are assembled to compose the main video data in one DUT. Data in the DUT is divided by a plurality of sectors on a physical format. Random access is ensured from an optical disk on which the compression-encoded video data is recorded on the data unit basis (DUT), the DUT including a predetermined number of GOPs.

9 Claims, 7 Drawing Sheets

FIG. 3

| DUT NUMBER | START SECTOR ADDRESS |
|---|---|
| 1 | 100 |
| 2 | 630 |
| 3 | 1075 |
| 4 | 1590 |
| ⋮ | ⋮ |
| 9600 | X |
| ⋮ | ⋮ |
| N | M |

X, M, N : INTEGER

FIG. 7

| V | V | V | V | V | A | V | V | V | V | V | V |

METHOD OF AND APPARATUS FOR RECORDING/REPRODUCING VIDEO DATA IN DATA UNITS AS A UNIT OF DATA CORRESPONDING TO A PREDETERMINED NUMBER OF PICTURES

BACKGROUND OF THE INVENTION

1. Field of the Invention

The present invention relates to a recording/reproducing apparatus and a recording/reproducing method, and to an optical disk, all for use in the field of, for example, an optical disk reproducing apparatus.

2. Description of the Related Art

There have been developed optical disk reproducing apparatuses for reproducing an optical disk on which audio data and video data are recorded in a digital form. Such an optical disk reproducing apparatus has widely been utilized as a reproducing apparatus in, for example, motion picture software, karaoke and so on. An optical disk for use in the optical disk reproducing apparatus has the same size as that of a CD (compact disk), and is therefore advantageous in that the whole of the apparatus is miniaturized.

This development of optical disk reproducing apparatuses has been realized under the circumstances that International Standardization of a compression system of videos has been promoted, and an MPEG (Moving Picture Image Coding Expert Group) system and so on have already been standardized.

FIG. 6 is a view illustrating an example of a recording format of audio and video data compression-encoded on an optical disk.

As illustrated in FIG. 6, the recording format comprises a read-in area 1, an information area 2, a data area 3, and a read-out area 4. The information area 2 corresponds to a track (program) 1. The data area 3 on which compressed video data and compressed audio data have been recorded corresponds to the tracks (program) 2 up to 99. Each track (program) of the data area 3 comprises an array of video data V and audio data A physically divided in sectors as illustrated in FIG. 7, and one audio sector A is arranged behind about six continuous video sectors V such that synchronization of the video and audio is established.

The address or the like of a head sector of each track (program) 2 in the data area 3 is recorded in the information area 2. The optical disk reproducing apparatus previously reads the control table in a memory. Upon receipt of the designation of a track (program) to be reproduced, the optical disk reproducing apparatus executes a seek operation by reading a head sector address of the objective track (program) from the control table in the memory.

In the above optical disk reproducing apparatus with the structure, although random access on the track (program) unit basis is possible, it is impossible to execute random access on a basis smaller than the track unit, e.g., on the GOP basis, the GOP being an encoding unit of an MPEG video.

In a conventional optical disk reproducing apparatus, random access is not ensured on a basis of the unit smaller than the track. For example, it is impossible to start access in the middle of a track.

SUMMARY OF THE INVENTION

The present invention is intended to solve these problems.

An object of the present invention is to provide a recording/reproducing method, a recording/reproducing apparatus, and a disk, wherein random access can be executed on a unit basis wherein the unit includes a predetermined number of GOPs or on a unit basis wherein the unit consists of a predetermined number of minimum groups of the video data, the groups which can be independently reproduced.

Another object of the present invention is to provide a recording/reproducing method, a recording/reproducing apparatus, and a disk, wherein random access can be executed on the unit basis and N times the speed of reproduction is easily realized by skipping each unit at the rate of 1/N.

To achieve the above objects, in the present invention, upon recording/reproducing compression-encoded video data, the video data is grouped and recorded in data units as a unit of data corresponding to a predetermined number of pictures, and thus recorded data is reproduced on the data unit basis.

Because the video data is grouped and recorded in data units as a unit of a predetermined number of GOPs (Group of Pictures) for example, the present invention can easily realize random access on the unit basis.

BRIEF DESCRIPTION OF THE DRAWINGS

FIG. 3 is a view illustrating an example of a control table recorded in a control area on the optical disk;

Figure 7:
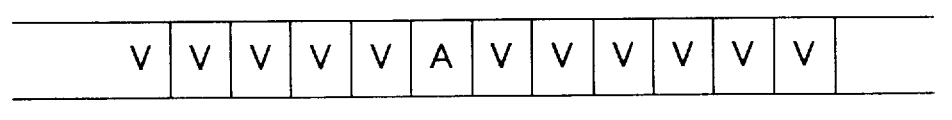

FIG. 7 is a view illustrating a sector arrangement in a data area of FIG. 6.

DESCRIPTION OF THE PREFERRED EMBODIMENT

In what follows, a preferred embodiment of the present invention will be described with reference to the accompanying drawings.

Figure 1:
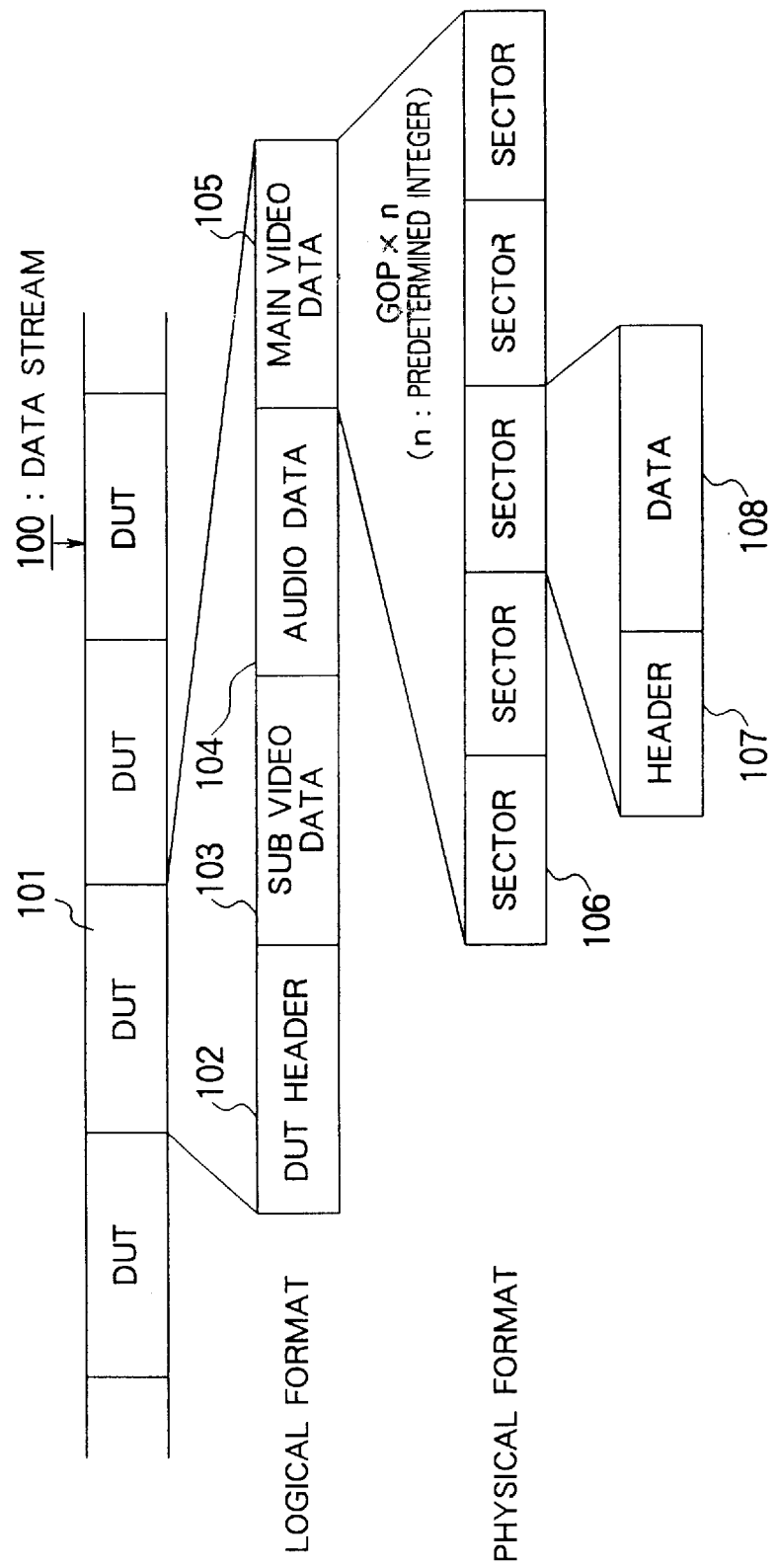
FIG. 1 is a view illustrating a physical format and a logical format of recorded data on an optical disk that is a recording medium according to the present invention.

FIG. 1 is a view illustrating a physical format and a logical format of recorded data on an optical disk that is a recording medium of one embodiment of the present invention.

In FIG. 1, numeral 100 denotes a data stream recorded on the optical disk. The data stream 100 comprises an assembly of data units with a variable length (hereinafter, referred to as a DUT) 101. The DUT 101 comprises, in the logical format, a DUT header 102, sub video data 103, audio data 104, and main video data 105. The sub video data 103, the audio data 104, and the main video data 105 are compression data with variable length, respectively.

Figure 2:
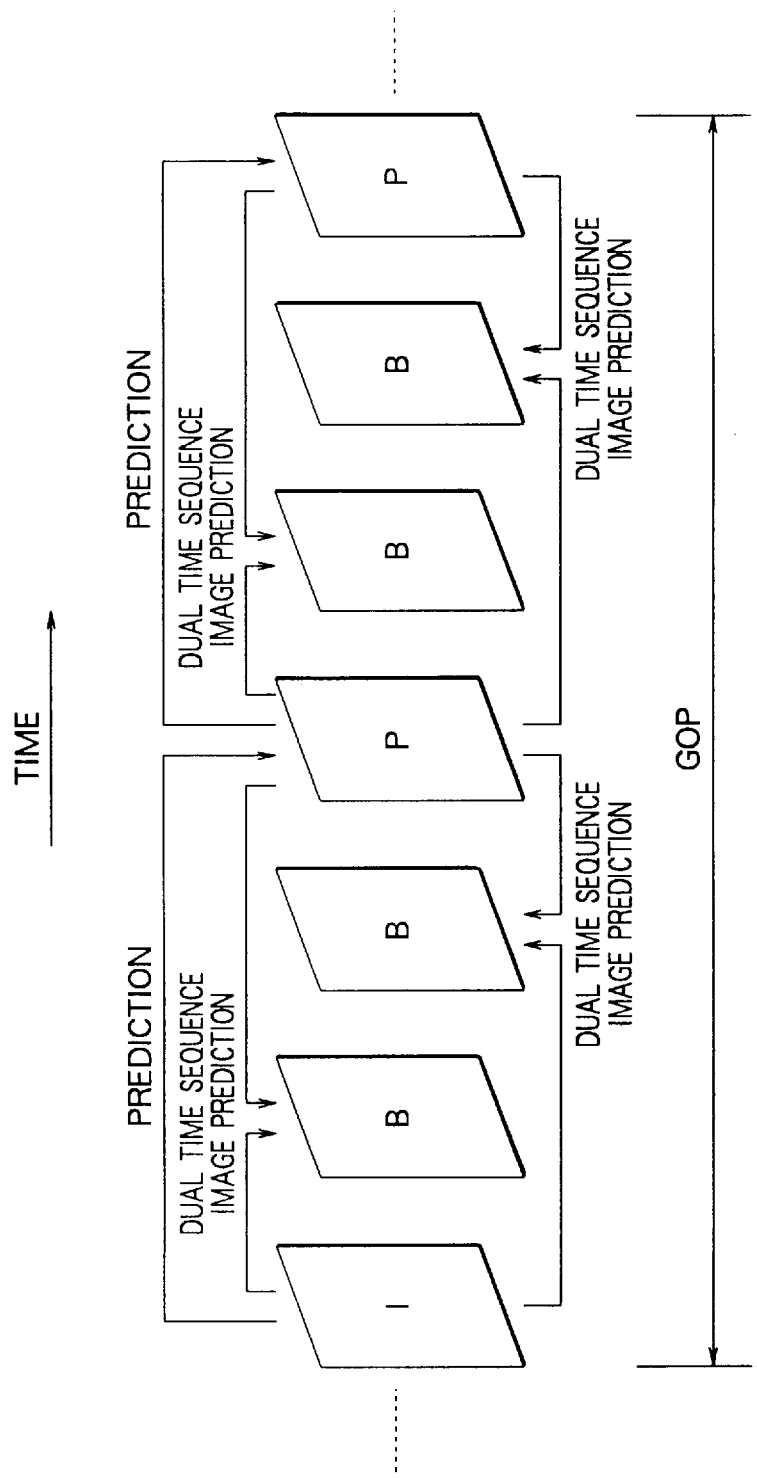
FIG. 2 is a view illustrating a GOP (Group of Pictures)

The main video data 105 is compression-encoded data of the MPEG. A predetermined number of GOPs (Group of Pictures) constituting an encoding unit is assembled to compose the main video data 105 in the DUT. The GOP is a minimum unit that is independently reproducible in the compression-encoded data of the MPEG. Referring to FIG. 2, the concept of the GOP will be described. As illustrated in FIG. 2, a picture in the GOP comprises a picture I, pictures P, and pictures B. The picture I is a picture image which is yielded by compressing an original picture image intactly, and the pictures P are picture images predicted from a previous picture I or a previous picture P. Each picture B is a picture image predicted from a previous picture I and a picture P behind the picture B, or from a previous picture P and a picture P behind the picture B. In such a manner, the GOP is a group of a plurality of successive field picture images or a plurality of successive frame picture images that are subjected to compression encoding. One GOP comprises 15 pictures that keep a video reproducing time of 0.5 second.

The sub video data 103 and the audio data 104 have signal lengths each of which is defined such that each reproduction time thereof is the same as that of the main video data 105. In other words, reproduction times of the sub video data 103, the audio data 104, and the main video data 105 in the DUT 101 are the same as the reproduction time of the main video data 105 composed of a predetermined number of the GOPS.

Each data in the DUT 101 comprises a plurality of sectors 106 on the physical format. Each sector 106 comprises a header 107 and data 108, and in the header 107 there is recorded information indicative of the address of the sector 106, a synchronizing signal for establishing of synchronization upon reproduction of data and so on. The sub video data is data which is superimposed on a video image, such as superimposed dialogue in movies, karaoke and so on.

FIG. 3 is a view illustrating an example of a control table recorded in a control area on the optical disk.

As illustrated in FIG. 3, on the control table there are recorded start sector addresses (100–M) respectively corresponding to the numbers (1–N) of the DUTs 101 recorded in the optical disk. The information recorded on the control area on the optical disk is read in an optical disk reproducing apparatus just after the system is started and is stored in a memory for a later access processing on the unit basis.

In the following, there will be described the reproducing apparatus for reproducing data from the optical disk.

Figure 4:
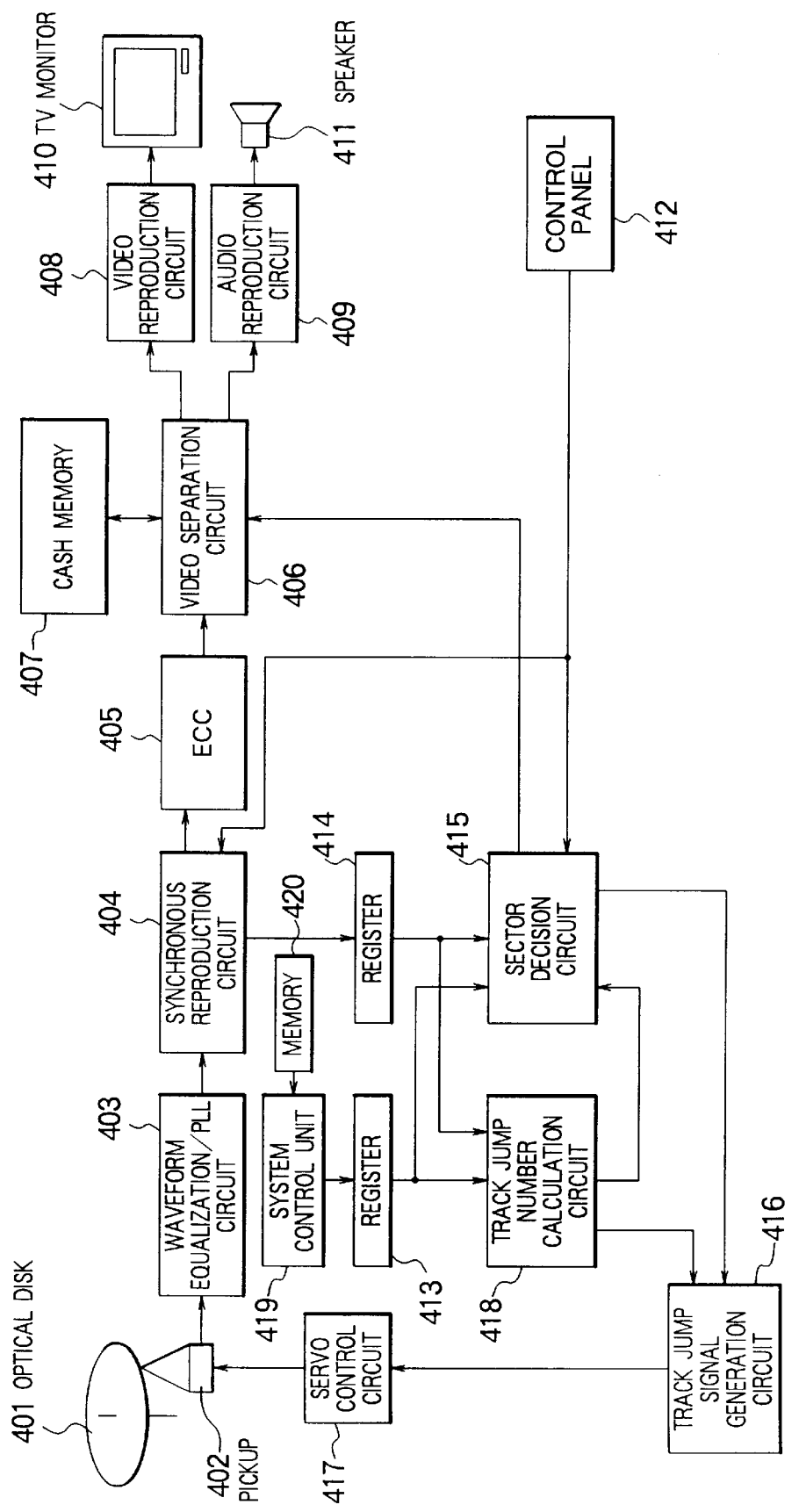
FIG. 4 is a block diagram illustrating the entire hardware structure of the optical disk reproducing apparatus for reproducing the optical disk having the recording format of FIG. 1.

FIG. 4 is a block diagram illustrating the entire hardware structure of the optical disk reproducing apparatus.

In FIG. 4, numeral 401 denotes an optical disk, and numeral 402 denotes a pickup for reading, as a reproduction signal the intensity of reflected light of laser light irradiated from the optical disk 401. The reproduction signal obtained by the pickup 402 is input into a waveform equalization/PLL circuit 403 in which it is subjected to processings, such as waveform equalization and data slicing, and is sent to a synchronous reproduction circuit 404 as a data stream. The synchronous reproduction circuit 404 detects a synchronizing header of a sector from the data stream and supplies data to be reproduced to an error correction circuit (ECC) 405. The ECC 405 executes error correction on the data, if any, and transfers a correction result to a video separation circuit 406. The video separation circuit 406 separates video data and audio data from the data and separately stores them in independent storage areas in a cash memory 407. The video data and the audio data stored in the cash memory 407 are each read out following requests from a video reproduction circuit 408 and an audio reproduction circuit 409 and are subjected to necessary signal processings in the video reproduction circuit 408 and the audio reproduction circuit 409, and are thereafter reproduced by a TV monitor 410 and a speaker 411.

Figure 5:
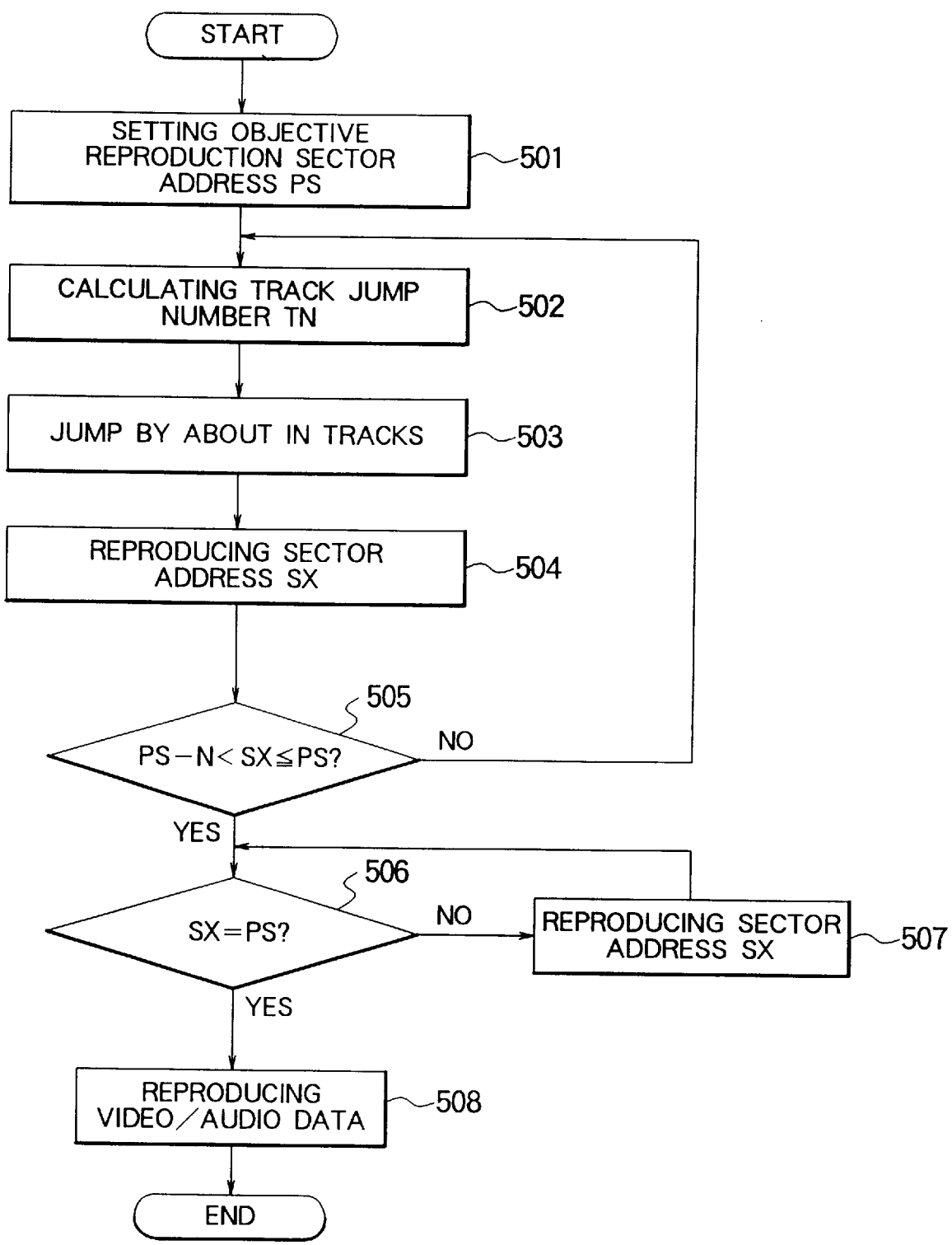
FIG. 5 is a flowchart illustrating the procedure of an access processing by the optical disk reproducing apparatus of FIG. 4.
Figure 6:
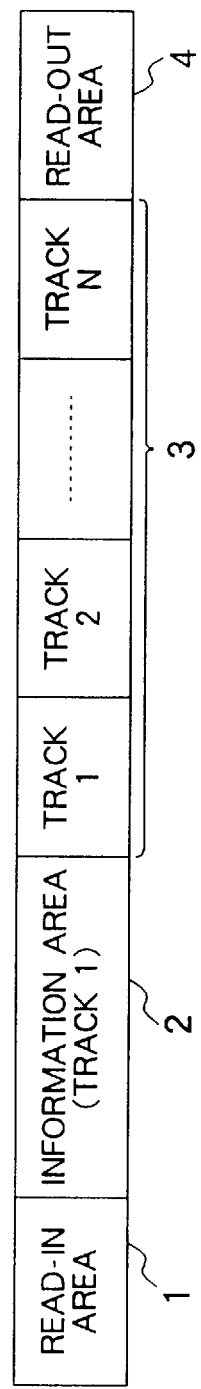
FIG. 6 is a view illustrating an example of a conventional recording format of compression-encoded audio and video data.
Figure 5:
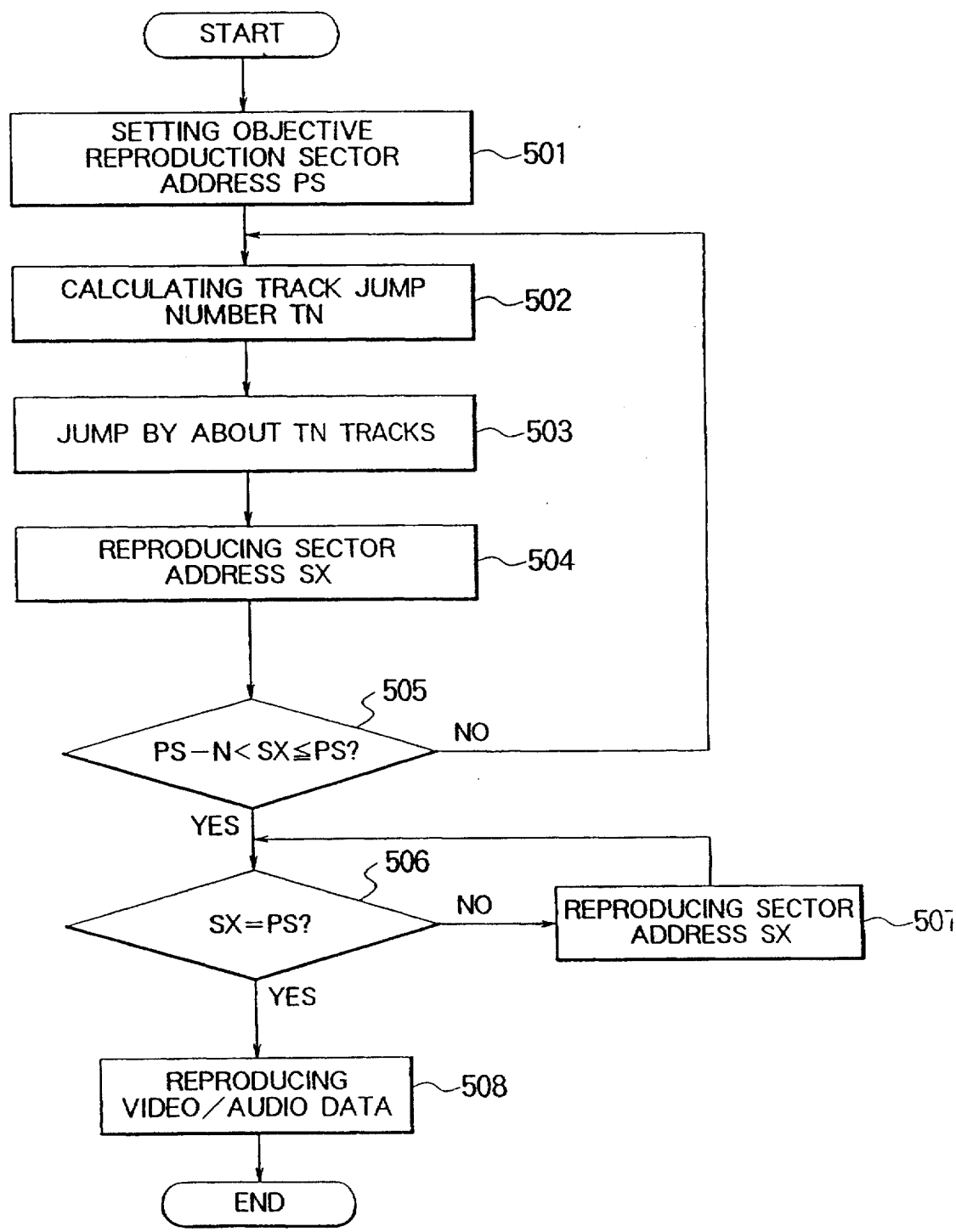
Figure 6:
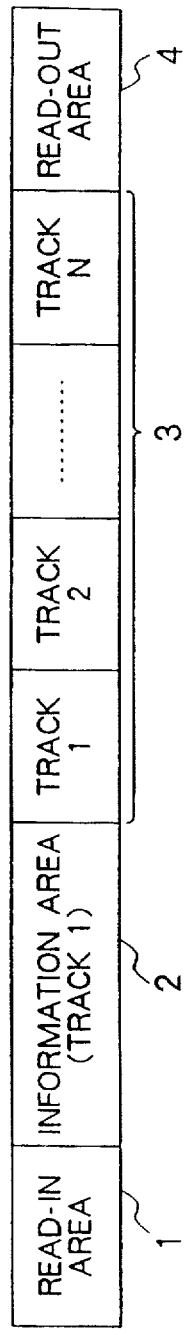

FIG. 5 is a flowchart illustrating an accessing processing procedure by the optical disk reproduction apparatus.

In the present embodiment, a user can designate with time a scene which he wants to reproduce. In this embodiment, there will be taken a case as an example where a medium on which a movie for 2 hours has been recorded is reproduced. For example, a user is assumed to have seen the movie for 1 hour and 20 minutes, and thereafter intends to see the rest of it.

In this case, the user instructs, via a control panel 412, the apparatus to start reproduction from a scene at 1 hour and 20 minutes from the beginning. A system control unit 419 searches an objective start sector address based upon designated time and the contents of the control table (FIG. 3) stored in a memory 420 as follows.

1 DUT is assumed to have been recorded as a unit of reproduction time of 0.5 second, for example. Thereupon, 1 hour and 20 minutes is converted to the number of the DUTs, 80 (minute)×60 (second/minute)×2 (DUT/second)=9600 (DUT). Accordingly, a start sector address X of the 9600th DUT may be read in from the control table in FIG. 3.

The system control portion 419 after searching the start sector address X in such a manner sets it to a register 413. Thereafter, a track jump number calculation circuit 418 incorporates the start sector number X from the register 413 as an objective reproduction sector address PS in step 501, and calculates a track number TN to be jumped from the objective reproduction sector address PS, and further sends the result to a track jump signal generation circuit 416 in step 502. The track jump signal generation circuit 416 supplies a jump signal to a servo control circuit 417 such that the pickup 402 track-jumps by about TN tracks. Hereby, the pickup 402 jumps to the neighborhood of the objective track in step 503.

Once the pickup 402 reaches the neighborhood of the objective track, the synchronous reproduction circuit 404 reproduces the sector address SX read from the optical disk 401 and sets the reproduced sector address SX to a register 414 in step 504. A sector decision circuit 415 decides whether or not the sector number SX stored in the register 414 satisfies the following condition in step 505:

$$PS-N < SX \leq PS$$

(N: a sector number corresponding to one track for example).

As a result, unless the reproduction sector number SX does not satisfy the above condition, a track number to be further jumped is calculated and a track jump is executed again.

In contrast, if the sector number SX satisfies the above condition, the reproduction of the sector address SX is continued as it is in step 507, and thereafter when the reproduction sector address SX is coincident with the objective reproduction sector address PS in step 506 the video data and the audio data are reproduced in step 508.

According to the present embodiment, the main video data 105 is grouped and recorded in the data units as a unit of a predetermined number of the GOPs together with the audio data, whereby random access to recorded data on the DUT basis is ensured. Further, accomplishing access on the DUT basis enables high speed reproduction such as 2 times and 4 times the speed of reproduction to be readily realized.

It is a matter of course that the number of the GOPs constituting the main video data 105 may be any number of 1 or more. More specifically, in the present invention, the GOPs are assembled by a predetermined number of 1 or more and are employed as the main video data 105 in one DUT, whereby a reproduction apparatus is ensured in which random access to recorded data on the optical disk can be executed on the minimum unit basis.

According to the present invention, as described above, random access is ensured on a unit basis, the unit including a predetermined number of GOPs or on a unit basis, wherein the unit consists of a predetermined number of minimum groups of the video data, groups which can be independently reproduced. Additionally, because random access can be executed on the unit basis, N times the speed of reproduction can easily be realized by skipping each unit at the rate of 1/N.

What is claimed is:

1. A method for recording and reproducing video data which are compression-encoded, the method comprising:

grouping and recording the video data in a plurality of data units, each data unit being a unit of data corresponding to a predetermined number of pictures including at least one Group of Pictures, each of said data units having a first header and a first data portion, said first data portion having a plurality of sectors, each of said sectors having a second header and a second data portion in which the video data are recorded; and reproducing the recorded video data based on the data units.

2. The method as set forth in claim 1, wherein the video data is grouped and recorded in each of the plurality of data units as a unit of data corresponding to minimum number of pictures within a group that can be reproduced independently.

3. The method as set forth in claim 1, wherein the compression-encoded video data is recorded on a disk and reproduced from a disk.

4. The method as set forth in claim 3, wherein each of the data units is divided into at least one sector and recorded on the disk, the sectors being a unit of a physical data amount adapted to the recorded on the disk.

5. The method as set forth in claim 4, wherein position information of the sectors, on which data in each of the data units is recorded, is recorded in a predetermined area on the disk independently from the data units, and the video data recorded on the disk is reproduced on the basis of the position information.

6. A method for recording video data which is compression-encoded, the method comprising:

grouping and recording the video data in a plurality of data units, each data unit being a unit of data corresponding to predetermined number of pictures including at least one Group of Pictures, each of said data units having a first header and a first data portion, said first data portion having a plurality of sectors, each of said sectors having a second header and a second data portion in which the video data are recorded.

7. The method as set forth in claim 6, wherein the video data is grouped and recorded in each of the plurality of data units as a unit of data corresponding to minimum number of pictures within a group that can be reproduced independently.

8. The method as set forth in claim 7, further comprising recording position information of the sectors in a predetermined area on the disk independently from the data units.

9. The method as set forth in claim 6, wherein each of the data units is divided into at least one sector and recorded on a disk, the sectors being a unit of a physical data amount adapted to be recorded on the disk.

* * * * *

UNITED STATES PATENT AND TRADEMARK OFFICE
CERTIFICATE OF CORRECTION

PATENT NO. : 5,774,441
DATED : Jun. 30, 1998
INVENTOR(S) : Nakagawa

It is certified that error appears in the above-identified patent and that said Letters Patent is hereby corrected as shown below:

Please delete drawing sheets 5-7 and substitute drawing sheets 5-7 as per attached.

Signed and Sealed this

Sixth Day of April, 1999

Attest:

Q. TODD DICKINSON

*Attesting Officer*     *Acting Commissioner of Patents and Trademarks*

FIG. 7 (PRIOR ART)

| V | V | V | V | V | A | V | V | V | V | V | V |
|---|---|---|---|---|---|---|---|---|---|---|---|